Patented Feb. 24, 1942

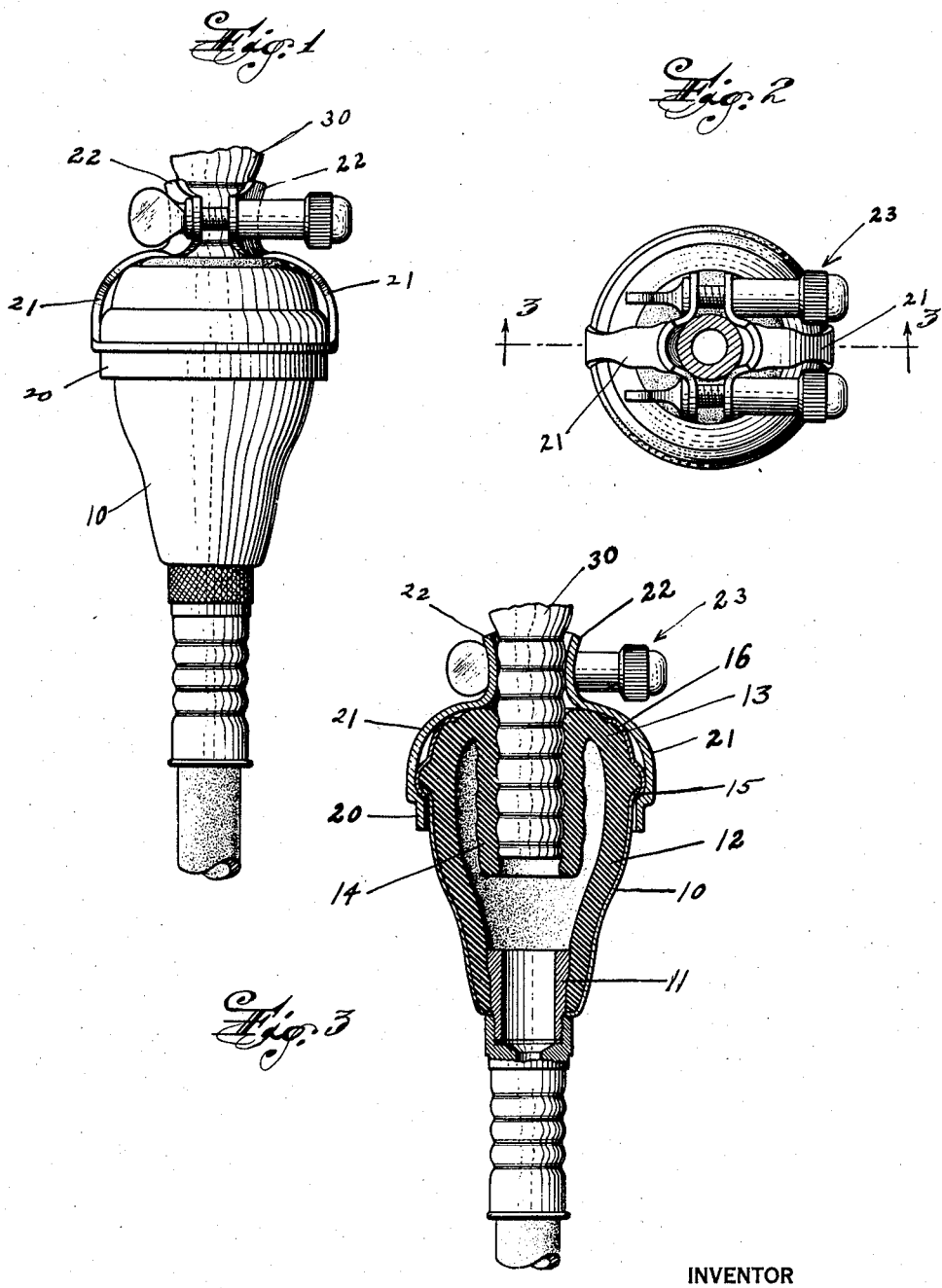

2,274,257

UNITED STATES PATENT OFFICE 2,274,257

CONNECTOR

Earl Lewis Rockwood, Toledo, Ohio, assignor to Gifford D. Davis, South Orange, N. J.

Original application July 18, 1940, Serial No. 346,086, now Patent No. 2,247,311, dated June 24, 1941. Divided and this application May 28, 1941, Serial No. 395,516

3 Claims. (Cl. 285—90)

This is a division of my patent application Serial No. 346,086, filed July 18, 1940, and matured into Patent No. 2,247,311, issued June 24, 1941. This invention is directed to a novel connecting device for connecting a hose or the like to a source of liquid supply.

It is well known that the water outlets in different places are of various shapes and sizes. In order to accommodate faucets, spigots and other outlets of different sizes, I have provided a connecting device which may be employed to make a water tight connection with certain outlets of different sizes and shapes.

According to the invention the connector may comprise an inverted hollow frustroconical rigid metal shell 10 having an exteriorly threaded hollow nipple 11 secured to its lower end and making a water tight connection therewith. A portion of the nipple 11 is located inside said shell 10 and a portion extends outwardly therefrom. Located within said shell 10 is an inverted frustro-conical resilient rubber member 12 whose lower end surrounds the inwardly extending portion of nipple 11 and is forced against the outer surface of the nipple 11 to make a water tight seal therewith. Integral with the member 12 and extending upwardly and inwardly therefrom is a flange 13 and extending downwardly from the inner edge of flange 13 and integral therewith is a resilient cylinder 14 extending downwardly into member 12 and terminating above the nipple 11.

The upper end of the shell 10 is flared slightly outwardly to provide a lip 15. Extending around the flange 13 and closely contiguous therewith over a large portion of its area is a wide metallic band 16 secured to shell 10 at its lip 15 and terminating outside of the inner extremity of the flange 13.

A rigid metallic ring or collar 20 may be mounted on the shell 10, with its upper end bearing against the lower end of the band 16. Integral with the ring 20 and extending upwardly and inwardly therefrom are a pair of diametrically, oppositely disposed bands 21 extending along the surface of the band 16 and terminating in ears 22. Nut and bolt arrangements 23 are carried by the ears 22 to move the ears towards each other.

In operation an outlet spigot 30 may be inserted into the cylinder 14 to make a water tight seal therewith. Then the nuts of the nut and bolt arrangement are tightened to force ears 22 towards each other and cause them to firmly grip the spigot 30 and thus securely anchor shell 10 to the spigot 30 and prevent accidental displacement of the connector and spigot 30.

When the water emanating from spigot 30 flows into the connector, the pressure exerted thereby against the resilient members 12, 13 and 14 cannot greatly distort these resilient members because of the rigid metallic shell 10 and band 16. Due to the construction disclosed, there is a self-locking action between the resilient cylinder member 14 and spigot 30 caused by the force exerted by the water against the outer wall of cylinder 14. The anchoring ears 22 anchor the collar 20 to the shell 10 to prevent the connector from accidentally being displaced from the spigot 30. A hose or the like may be connected to the outer threaded end of the nipple 11 extending outside of shell 10.

Although the invention has been described in detail, this is not by way of limitation, but merely by way of description.

I claim:

1. A connector comprising a hollow resilient body of progressively decreasing diameter, an inwardly and upwardly extending resilient flange integral with said body, a downwardly extending hollow resilient means integral with said flange, depending therefrom and disposed in said body, a rigid shell surrounding said body, a rigid band surrounding said flange and coupled with said shell, a nipple extending inside and outside of said shell, said nipple carried by said shell and body and making a watertight connection therewith, the lower portion of said resilient body located between the lower portion of said shell and the upper portion of said nipple.

2. A connector comprising an inverted hollow frustroconical resilient body, an upwardly, inwardly extending flange integral with said body, a downwardly extending resilient outlet grip member integral with said flange and depending therefrom, said member disposed in said body, a nipple, a part of said nipple surrounded by the lower part of said body and contiguous therewith, another part of said nipple extending outwardly from said body, a rigid shell surrounding said body and making a water tight connection between said nipple, shell and body, a band located on said flange, said band and shell secured to each other, a collar extending around said shell near the juncture between said shell and band, a pair of arms integral with said collar, extending upwardly therefrom and towards each other, a clamping ear integral with each arm at the upper end thereof and means adapted to move said ears towards each other.

3. A connector comprising an inverted hollow frustroconical resilient body, an upwardly, inwardly extending flange integral with said body, a downwardly extending resilient outlet grip member integral with said flange and depending therefrom, said member disposed in said body, a nipple, a part of said nipple surrounded by the lower part of said body and contiguous therewith, another part of said nipple extending outwardly from said body, a rigid shell surrounding said body and making a water tight connection between said nipple, shell and body, a band located on said flange, said band and shell secured to each other, a collar extending around said shell near the juncture between said shell and band and means connected to said collar for anchoring the same.

EARL LEWIS ROCKWOOD.